(No Model.)
W. PARKS & S. M. SMITH.
WAGON BRAKE.
No. 300,500. Patented June 17, 1884.
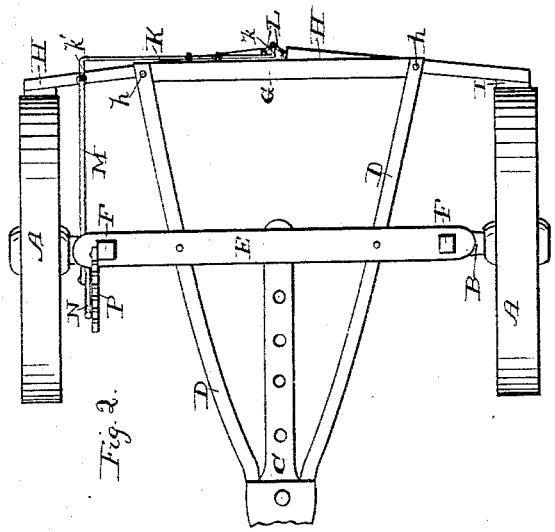
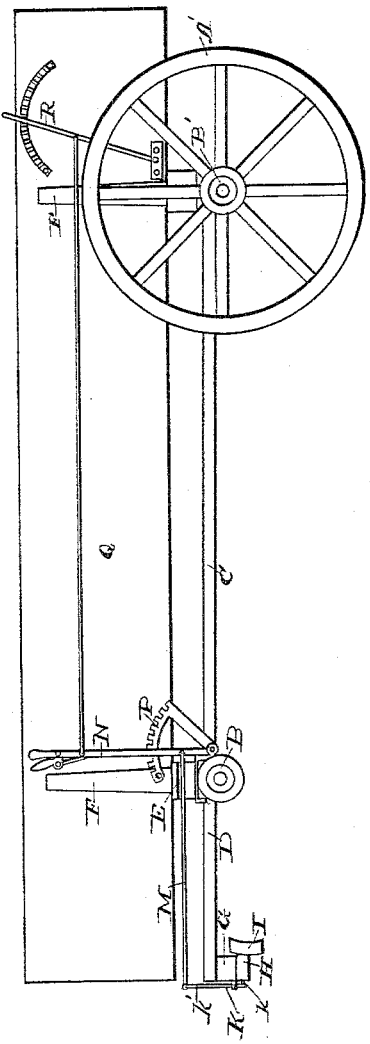
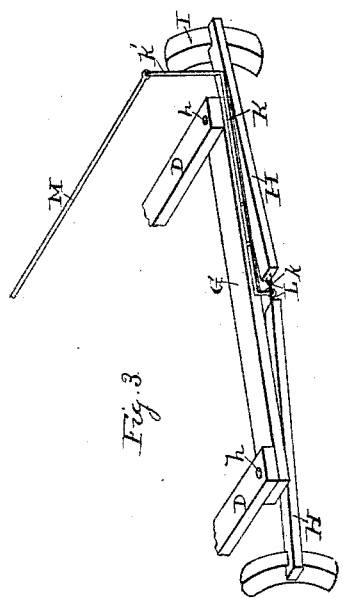
Witnesses:
H. E. Blip
J. S. Barker.
Inventors:
Warren Parks
and Samuel M. Smith
by Charles King and Wm. B. King attys

UNITED STATES PATENT OFFICE.

WARREN PARKS AND SAMUEL M. SMITH, OF CASSVILLE, MISSOURI.

WAGON-BRAKE.

SPECIFICATION forming part of Letters Patent No. 300,500, dated June 17, 1884.

Application filed March 11, 1884. (No model.)

*To all whom it may concern:*

Be it known that we, WARREN PARKS and SAMUEL M. SMITH, citizens of the United States, residing at Cassville, in the county of Barry and State of Missouri, have invented certain new and useful Improvements in Wagon-Brakes, of which the following is a specification, reference being had therein to the accompanying drawings.

Figure 1 is a side view of a wagon, part of the box and one of the rear wheels being removed to more clearly show our invention. Fig. 2 is a top view of the running-gear, the brakes being shown applied to the wheels. Fig. 3 is a perspective view showing our device applied to the rear extensions of the hounds.

In the drawings, A' represents the front wheels; A, the rear wheels; B', the front axle; B, the rear axle; C, the reach; D, the rear hounds; E, the bolster upon the rear axle, and F the stakes or posts. The hounds D extend rearwardly some distance behind axle B, and are connected together by the cross-bar G.

H H are the brake-bars, pivoted at $h$ to the under side of the bar G, and carrying at their outer ends brake shoes or rubs I, which are made to bear upon the rear of the hind wheels, somewhat above their center.

K is a double-cranked rock-bar secured to the rear face of the bar G by any preferred means. The bar is bent at its inner end to form a short downwardly-extending crank or arm, $k$, and at its opposite or outer end to form the longer upwardly-projecting arm, $k'$. The inner ends of the brake-bars are connected to the short arm $k$ of the rock-bar by means of links L or other flexible connection, so that any rocking of the bar K will move the brakes toward or from the wheels.

M is a link connecting the arm $k'$ of the rock-bar with a brake, N, pivoted to the rear axle, the link passing between the axle B and the bolster E. The brake-lever carries a spring-dog, O, which engages with the segmental rack P, so that the brake may be set and locked in any desired position. The lever N and rack P are mounted outside of the posts F, so that there will be no interference with the box when it is placed upon the running-gear. We prefer to cast the rack with a socket, by which it may be secured to the axle, and with a lug projecting slightly in front of the axle, in or to which the lever N is pivoted.

The brake-bars H lie directly below the bar G when the rubs or shoes are off from the wheels, the short crank or arm $k$ in this case lying close to the rear face of bar G; but when the brake-lever and arm $k'$ are thrown forward, the bars H are drawn into the position shown in Fig. 2 by means of the short arm $k$ and links L, and the brakes applied to the wheels.

We prefer to mount the brakes so that they will bear upon the rear of the hind wheels, as in wet weather the shoes operate to remove the mud before it is carried up over the axle, and it does not tend to bank up upon the wheels and brakes, as it does when the brakes bear against the forward part of the wheel. The method of mounting shown is strong, rigid, and inexpensive, and is such that it may be applied to any lumber-wagon with very slight alterations. By pivoting the brake-bars below the cross-bar G we not only secure rigidity, but also lessen the danger of interference with their free movement by clogging or otherwise, as these bars are entirely protected when the brakes are not in use.

It will be seen that the above-described mechanism is mounted entirely upon the running-gear, and is adapted to be used when the wagon is employed without a box; but we have shown an arrangement by which the brakes may be applied with equal advantage when the box is in place.

Q is a rod or link connecting the brake-lever N with another brake-lever, R, attached to the side of the wagon-box near its forward end, it being provided with the usual dog and rack or other locking device. It will of course be understood that when the lever R is used the locking device upon the rear brake-lever, N, will be secured so as not to operate.

What we claim is—

1. The combination of the hounds extending rearwardly from the axle B, the cross-bar connecting the hounds near their rear ends, the brake-bars H H, pivoted to said connecting-bar, a double-cranked rock-bar mounted upon said connecting-bar, one arm of which is connected with the inner ends of the brake-bars, a brake-lever, and a link connecting the other arm of the rock-bar with the brake-lever, substantially as set forth.

2. In a wagon, the combination of the hounds extending rearwardly from the axle E, the cross-bar connecting the hounds near their rear ends, the brake-bars H H, pivoted below the cross-bar, and having their inner ends close together near the center of the cross-bar, the rocking bar K, mounted upon the rear face of the connecting-bar, having an arm, $k$, connected to the inner ends of brake-bars H, and an arm, $k'$, a brake-lever mounted upon the rear axle outside of the post F, a rod connecting the brake-lever with the arm $k'$, and mechanism adapted to lock the brake-lever in any position, substantially as set forth.

3. The combination of the hounds extending rearwardly from the axle, the cross-bar connecting the hounds near their ends, the brake-bars H H, pivoted to said connecting-bar, and mechanism, substantially such as described, for operating said brake-bars, as set forth.

In testimony whereof we affix our signatures in presence of two witnesses.

WARREN PARKS.
SAMUEL M. SMITH.

Witnesses:
W. L. MARTIN,
W. H. RAMSAY.